May 8, 1928.
B. H. SMITH
1,668,738
INDICATOR SWITCH
Filed Oct. 23, 1922
3 Sheets-Sheet 1
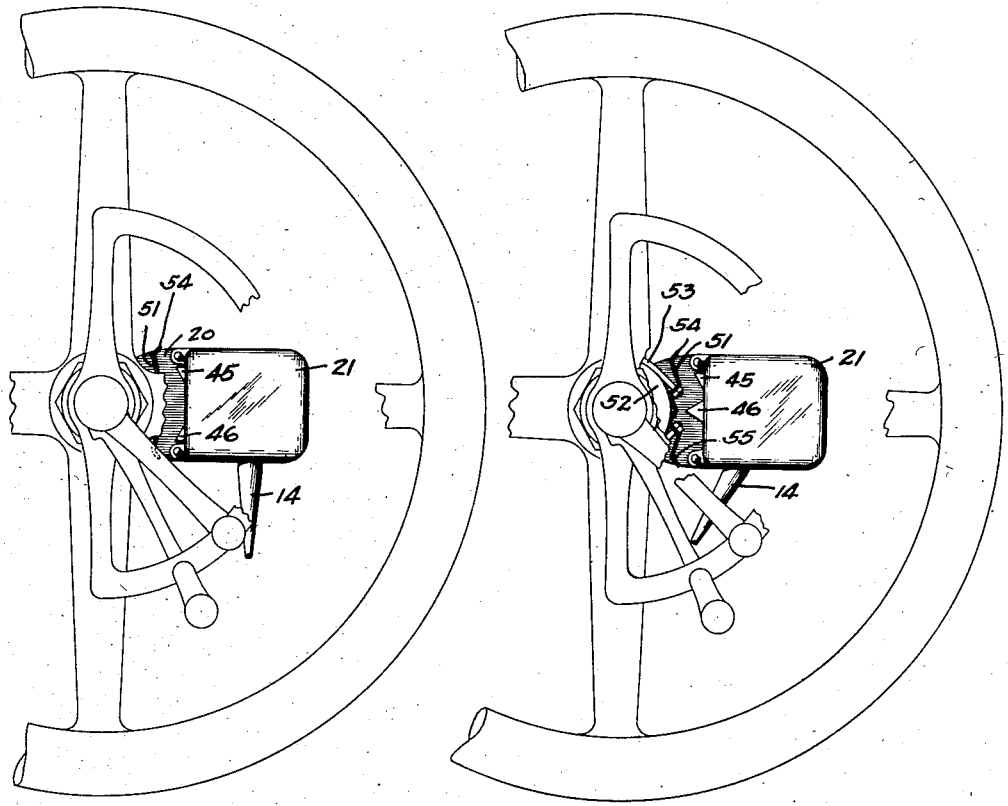
FIG.1.  FIG.2.
FIG.3.
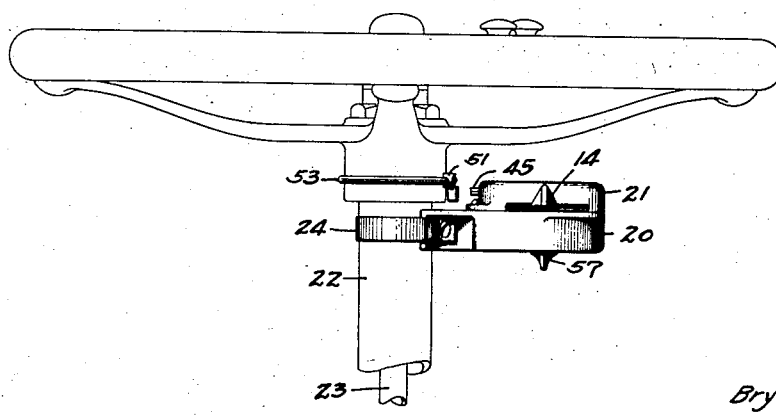
WITNESS:
H. Sherburne
INVENTOR.
Bryan H. Smith
BY White Prost Evans
his ATTORNEYS.

May 8, 1928.

B. H. SMITH 1,668,738

INDICATOR SWITCH

Filed Oct. 23, 1922

INVENTOR.
Bryan H. Smith.
BY White Prost Evans
his ATTORNEYS.

WITNESS
H. Sherburne

May 8, 1928.
B. H. SMITH
1,668,738
INDICATOR SWITCH
Filed Oct. 23, 1922
3 Sheets-Sheet 3
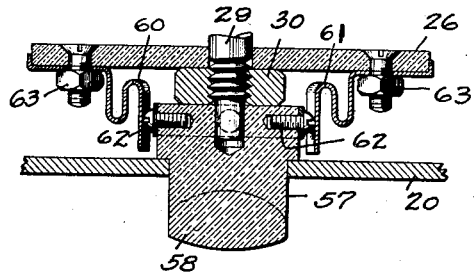
FIG.7.
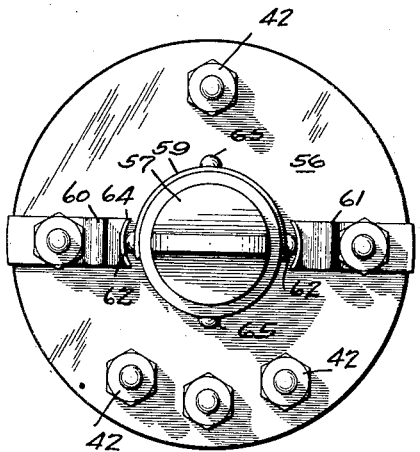
FIG.8.
FIG.9.
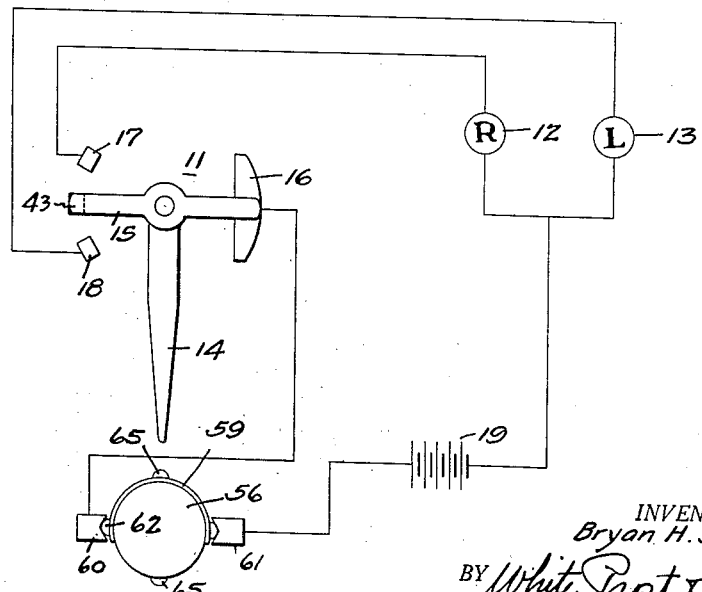
INVENTOR.
Bryan H. Smith
BY White Prost Evans
his ATTORNEYS.
WITNESS:
H. Sherburne Patented May 8, 1928.

1,668,738

UNITED STATES PATENT OFFICE.

BRYAN H. SMITH, OF BERKELEY, CALIFORNIA.

INDICATOR SWITCH.

Application filed October 23, 1922. Serial No. 596,430.

This invention relates to an indicator, and more particularly to a device adapted to be used on automobiles, for indicating whether the driver intends to turn to the right or to the left.

Indicators of this general character in which electric lamps are utilized to throw a light on or through a signaling sign are well known. In certain types of these devices, the arrangement is such that after manual operation of the signal by the driver, the completion of the steering operation causes the indicator to become inactive. This has been accomplished by mounting an actuator directly in the steering column or on the steering wheel. It is one of the objects of my invention to provide a simplified indicating arrangement of this character, which is inexpensive to construct and is simple to manipulate.

It is another object of my invention to provide an indicator that is incapable of causing an improper signal for any substantial period in case the driver happens to turn in a direction different from that indicated by a direct prior operation of the indicator.

It is still another object of my invention to provide a compact, unitary switching arrangement for the indicator circuits.

My invention possesses other advantageous features, some of which, with the foregoing, will be set forth at length in the following description, where I shall outline in full that form of the invention which I have selected for illustration in the drawings accompanying and forming part of the present specification. Although in the drawings I have shown but one embodiment of my invention, I do not desire to be limited thereto, since the invention as expressed in the claims may be embodied in other forms also.

Referring to the drawings:

Figure 1 is a plan view of a steering gear equipped with a device embodying my invention;

Fig. 2 is a view similar to Fig. 1, but with some of the parts in a different position, for illustrating the mode of operation of the device;

Fig. 3 is a side view of the apparatus shown in Fig. 1;

Fig. 7 is a partial sectional view taken along plane 7—7 of Fig. 5;

Fig. 8 is a view looking from the bottom of Fig. 5, with certain of the parts removed; and Fig. 9 is a wiring diagram of the signaling system.

Figure 4:
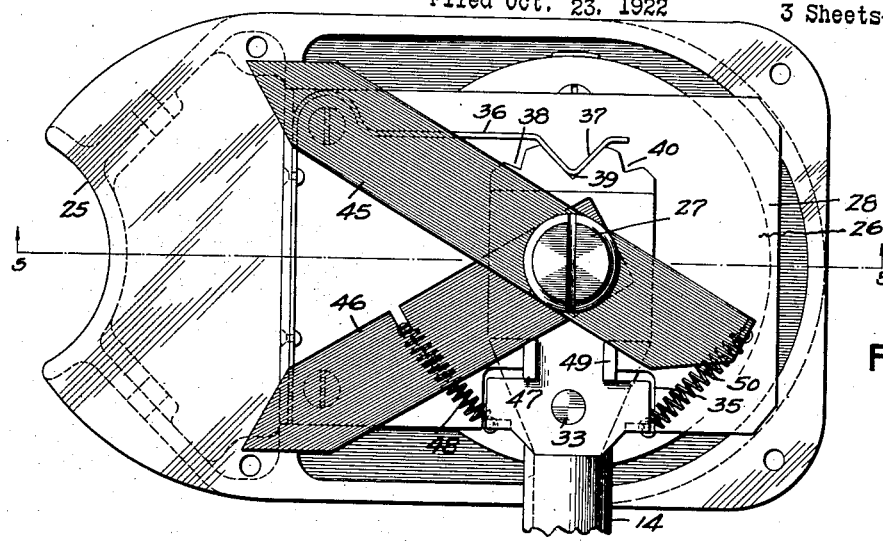
Fig. 4 is a plan view of the control switch of my invention with the cover removed.

As shown in Fig. 9, a control switch 11 is arranged to light either of two sets of lamps 12—13, labeled respectively R and L, of a motor vehicle indicator. The indicator is so arranged that upon lighting of lamps 12, a right hand signal is given while upon lighting of lamp 13, a left hand signal is given. The operation of the switch may be effected by movement of a handle 14, which in turn causes a contact blade 15 or the like to complete the connection either between contact pieces 16 and 17, or between contacts 16 and 18. In the first case the circuit for lamps 12 is completed through battery 19 or some other source of electric energy, while in the second case the circuit for lamps 13 is completed.

Figure 5:
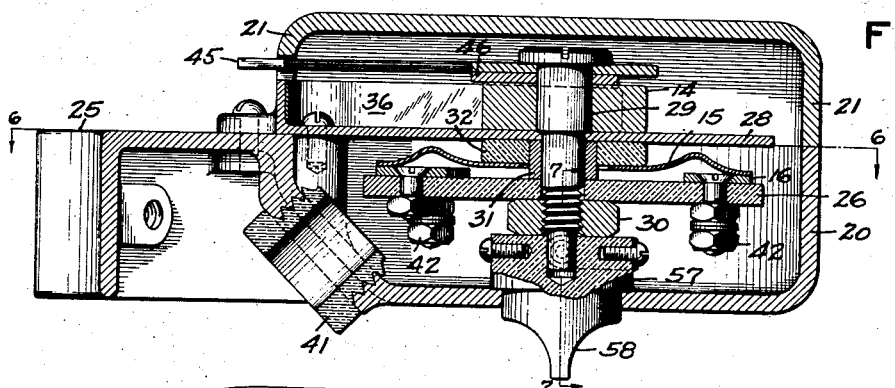
Fig. 5 is an enlarged sectional view taken along plane 5—5 of Fig. 4.
Figure 6:
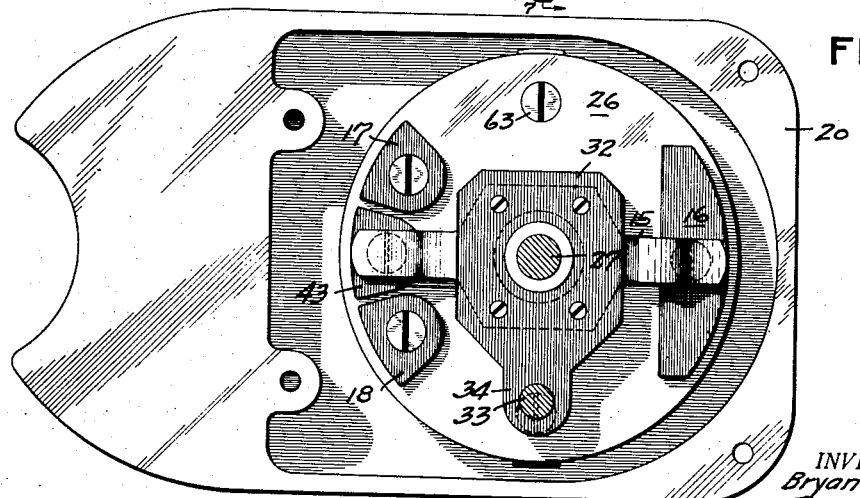
Fig. 6 is a sectional view taken along plane 6—6 of Fig. 5.

That feature of the construction of switch 11 which renders this manual operation possible may best be understood by the aid of Figs. 4, 5 and 6. In these figures the switch 11 is shown as encased in a bottom casing 20 and a top casing or cover 21. These members may be readily manufactured from castings. For convenience of operation the entire switch 11 is arranged to be fastened to one side of the stationary post 22 surrounding the steering column 23, as by the aid of strap 24 and a bowed extension 25 of the lower casing member 20. The stationary contacts 16, 17, and 18 which in the present instance are shown merely as flat plates, are fastened to a stationary strip 26 of insulation, such as fibre. This strip 26 is appropriately held in place within the casing members 20 and 21 by the aid of a stationary stud or pivot pin 27. This stud may be held on a central plate or support 28, through which the stud passes. A shoulder 29 on the stud engages the upper surface of the plate 28, and a nut 30 threaded on the stud 27 serves to tighten this stud, a bushing 31 and the insulation strip 26, together.

The movable contact finger 15 may appropriately be pivoted on bushing 31 by the aid of an insulation piece 32, to which the contact finger 15 is fastened. This piece 32 is furthermore freely rotatable about the bushing 31. In order that movement of handle 14 may cause rotation of this piece 32 and consequently of contact finger 15, the handle 14 is likewise pivoted on the stud 27 above plate 28, and carries a depending pin 33 engaging an aperture in the extension 34 of the piece 32. It is thus evident that rotation of the handle 14 in one or the other direction causes a corresponding rotation of the finger 15, due to the mechanical connection between the two parts. In order to permit the pin 33 to engage the aperture, as well as to permit movement of the handle 14 relative to plate 28, this place is partially cut away at 35, as shown most clearly in Fig. 4. Furthermore, the handle 14 extends through the top cover 21 so as to be readily manipulated from the outside. To prevent the handle from rotating too far in either direction, as well as to insure that it will come to rest in one of the three operative positions, a flat spring 36 may be provided, having a projection 37 adapted to engage any one of the three notches 38, 39 and 40 in the rear portion of handle 14. The relative positions of notches 38 and 40 are such that the movement of the handle 14 permitted thereby is just sufficient to cause engagement of the finger 15 either with contact 17 or 18; while the central notch 39 is so arranged that when the projection 37 is engaged therewith, the contact finger 15 is in a neutral position between the contacts 17 and 18, and out of connection therewith. The contact piece 16 is, however, made large enough to maintain connection with finger 15 in all its positions.

In order that the proper electrical connections may be made to the various contact elements, a bushed aperture 41 is provided in the bottom casing 20. Furthermore, appropriate contact studs 42 may be provided for the contact points 16, 17 and 18. A dummy contact point 43 is shown for the central position of the finger 15, although ordinarily this is not essential.

As thus far described, it is evident that appropriate indications are obtained upon the manual operation of handle 14 either to the right or left. Upon making the turn indicated, the steering wheel 44 is turned in a corresponding direction. After the turn is accomplished, the steering wheel 44 is returned to its center position. It is then necessary to restore the signaling circuit to its original condition. This may be accomplished manually by movement of handle 14 to its central position. It is preferable, however, to perform this movement automatically in response to the return of the steering wheel 44 to its central position. For effecting this result, I provide a pair of arms 45 and 46, pivoted on stud 27, so arranged that one or the other is rotated about the axis of pin 27, depending upon the direction of movement of handle 14. Thus upon movement of this handle to the left, the arm 46 is moved so as to extend outside of switch casing 21 in a direction substantially parallel with the main center line of the switch 11, as shown in Fig. 2. This movement is effected by a mechanical connection between the handle and the arm 46. Thus there may be a projection or stop 47 on handle 14, engaging the edge of arm 46. A flexible connection such as spring 48 insures contact between the arm 46 and stop 47, while at the same time under certain conditions it permits separation of these parts. An entirely similar arrangement is provided for the arm 45, which arrangement includes the stop 49 and spring 50. In this way, movement of handle 14 to the right will cause arm 45 to extend outside of the casing for switch 11, in the same manner that arm 46 extends outwardly in Fig. 2 of the drawing.

An appropriate device is connected to the steering wheel 44 for engaging either one of the arms 45 or 46 to return the handle 14, and therefore the contacts, to a central position. This device is a dog 51 having the symmetrically arranged projections 54 and 55, and held to the hub 52 of the steering wheel 44 by the aid of a tie rod 53. If for example the handle 14 is moved to the left as shown in Fig. 2, to cause a "left" indication, the end of arm 46 will be in the path of movement of the dog 51. However, upon turning the wheel 44 to the left, the only effect upon the mechanism is the stretching of spring 48 and the separation of stop 47 and arm 46. Upon straightening out of the wheel 44, however, the lower end of the dog 51 pushes arm 46 downward, and this causes a return of handle 14 to central position. The operation of the handle 14 to the right to cause a "right" indication results in a similar sequence of events in connection with the arm 45 and the upper end of the dog 51.

When either arm 45 or 46 is projected into the path of dog 51, it occupies a position corresponding to the central position of the dog 51 while the steering wheel is straight. The main difference, however, between the two arms is that arm 45 must be rotated in a clockwise direction from this central position to be effective on switch 11, while arm 46 must be rotated in the opposite direction. This arrangement whereby the positions of the two arms coincide centrally between the two projections 54 and 55 serves the purpose of preventing incorrect signals to be given for any substantial period by the driver. Thus for instance if he turns the handle 14 to the left so as to project arm 46 out in the path of dog 51, but turns to the right, the upper projection 54 immediately replaces the arm 46 and handle 14 to inoperative position, even before the turn is completed.

It may under certain circumstances be advisable to place a master control switch in circuit with the signals so as to render the entire system operative or inoperative at will. For this purpose, there is conveniently arranged, in casings 20 and 21, a second switch 56, which comprises a manually rotatable, non-conducting cylinder 57, pivoted on the bottom end of stud 27. This cylinder has a portion 58 projecting through the bottom casing 20 and serving as a handle whereby the cylinder may be rotated into closed or open position. This cylinder, as shown in greater detail in Fig. 8, carries a conducting segment 59 that extends just far enough to cause contact between two stationary contact springs 60 and 61. The segment 59 is attached to the cylinder by the aid of headed fastenings 62, which also serve to engage the contact springs. These springs are fastened to the under side of the insulation strip 26 by the aid of screws 63. These screws 63 may be used also for the binding posts. The contact springs 60 and 61 are preferably so shaped that they form a hollow or depression 64 for the accommodation of the heads of the fastenings 62, and in this way there is little danger that the position of the switch will be disturbed due to jarring or the like. It is evident that by a simple rotation of cylinder 57, the contact between members 60 and 61 can be completed or interrupted. For maintaining the switch 56 in open position, a pair of headed fastenings 65 are used, displaced from the active pair 62, and used merely to position the cylinder 57 in the depressions 64.

As shown in the wiring diagram of Fig. 9, the switch 56 may be connected in series to the battery 19 so as to control the entire signaling system, although of course other uses may be made of it, such as for the control of a tail light.

I claim:

1. The combination with an element adapted to be rotated in either direction from normal position, of a switch, means for operating the switch, a pair of stops carried by said means, a pair of members engaging said stops, resilient means for urging said members against the stops, whereby movement of one of the members in one direction only causes operation of the switch and movement of the other member in the other direction only causes operation of the switch, and an actuator having a pair of spaced projections carried by the rotatable element for operating said members.

2. The combination with an element provided with an actuator having a pair of spaced projections and adapted to be rotated in either direction from normal position, of a switch having a central pivot pin, a lever for operating the switch rotatable about the axis of the pin, a pair of arms also rotatable about this axis, a projection on one side of the lever, a resilient connection for urging one of the arms against this projection, another projection on the other side of the lever, a resilient connection for urging the other arm against this projection, the arrangement being such that the two arms are urged in opposite directions by the resilient connection, and means whereby movement of the lever to operate the switch in one direction causes movement of one of the arms between the projections of the actuator and whereby movement of the lever to operate the switch in the other direction causes movement of the other arm between the projections of the actuator.

3. In a switch for a direction signal, a stationary stud, a contact rotatable about the stud, a plurality of stationary contacts adapted to coact with the rotatable contact to open and close electric circuits, and means for rendering the entire switch inoperative, comprising a cylinder rotatable about the stud, a contact segment on said cylinder and a pair of stationary contacts adapted to be bridged by said segment.

In testimony whereof, I have hereunto set my hand.

BRYAN H. SMITH.